United States Patent Office 3,565,852
Patented Feb. 23, 1971

3,565,852
PREPARATION OF MOULDING MATERIAL STARTING FROM POLYETHYLENE TEREPHTHALATE
André Jan Conix, Antwerp, and Lambert Gaston Jeurissen, Mortsel, Belgium, assignors to Gevaert-Agfa N.V., Mortsel, Belgium, a Belgian company
No Drawing. Filed June 24, 1968, Ser. No. 739,185
Claims priority, application Great Britain, June 29, 1967, 30,139/67
Int. Cl. C08g 51/04, 49/04
U.S. Cl. 260—40
23 Claims

ABSTRACT OF THE DISCLOSURE

A moulding material having improved properties comprising a mixture of polyethylene terephthalate having an inherent viscosity of at least 0.65 dl./g. measured at 25° C. in a 60:40 mixture of phenol and tetrachloroethane, an amount of 0.1 to 10 percent by weight of a saturated polyester at least partly aliphatic in nature, compatible with polyethylene terephthalate, and having a polymer melt temperature of at most 150° C. and an inherent viscosity of at least 0.3 dl./g., and 0 to 1 percent by weight of a finely divided, inert, mineral, solid substance having an average particle size of less than $10\mu$ and method of preparing same is described.

---

On manufacturing photographic film base from polyethylene terephthalate a considerable amount of scrap is always formed. At a later stage this amount is still increased by the scrap which is formed during the subsequent steps of the manufacture of photographic material, for instance during the subbing step, the step of coating the various emulsion layers and the step of cutting in sizes the finished photographic film. Because very great demands are made to the supports for photographic applications, a large part of this scrap, even after elimination of emulsion layers and other layers, is no longer suited for re-use after having been mixed with fresh polyethylene terephthalate, because of colour deterioration and of degradation in molecular weight, which has occurred in the scrap material.

On the other hand it was difficult up to now to make use of polyethylene terephthalate as a moulding material. As is generally known it is possible by injection-moulding to manufacture from polyethylene terephthalate amorphous articles having good impact strength. Above the glass transition temperature of about 90° C., however, these articles are not dimensionally stable. In order to obtain articles on the base of polyethylene terephthalate that for practical purposes possess a sufficient dimensional stability and that maintain this dimensional stability at temperatures above the glass transition temperature, the polymer must be crystallized. This crystallization can occur at a temperature between 120 and 240° C. but it is associated with a considerable decrease of impact strength. In addition thereto, the process of crystallization of polyethylene terephthalate occurs too slowly at 140° C., so that the shaped articles have to be kept in the moulds for a relatively long time, which in practice is completely uneconomical.

A method has now been developed according to which a moulding powder can be prepared by starting from polyethylene terephthalate and especially from scrap of polyethylene terephthalate film and by means of which crystalline articles can be obtained that possess a good impact strength and a good dimensional stability.

The method according to the invention for the preparation of moulding material starting from polyethylene terephthalate is characterized thereby that polyethylene terephthalate having an inherent viscosity of at least 0.65 dl./g. (measured at 25° C. in a 60:40 mixture of phenol and tetrachloroethane) is mixed with (A) an amount of 0.1 to 10% by weight of a polyester having a polymer melt temperature of at most 150° C. and an inherent viscosity of at least 0.3 dl./g., and (B) with 0 to 1% by weight of a finely divided, inert, mineral, solid substance having an average particle size of less than $10\mu$.

A polyethylene terephthalate modified in such a way is very suited for being used as a moulding material.

In order that the moulding material obtained according to the method of the invention should possess the required properties, the molecular weight of the polyethylene terephthalate must be sufficiently high and correspond to an inherent viscosity of at least 0.65 dl./g., preferably of more than 0.85 dl./g. When scrap is used originating from polyethylene terephthalate film or from any other polyethylene terephthalate articles, the molecular weight of the polyester will have decreased during the manipulations it endured, such as its extrusion to film. In most instances its inherent viscosity will be much lower than 0.65 dl./g., so that it is necessary to increase its molecular weight again.

An increasing of the molecular weight can be attained most favourably by a re-polycondensation in solid phase. As is generally known, this solid phase re-polycondensation can be carried out according to different processes, for example by heating powdery polyethylene terephthalate in fluidized form in an inert gas atmosphere, at a temperature of about 200° C. or by subjecting powdery or granulate polyethylene terephthalate in a suitable apparatus to a vacuum treatment at high temperatures.

It has been observed that for recovering film scrap this re-polycondensation can be executed successfully in a vacuum tumbling drier, i.e. an apparatus that is normally used for drying polyester granulate before its extrusion. For this purpose the film scrap is brought in the form of chips, sizing at most about 10 sq. cm. preferably about 1 sq. cm. These chips while being agitated are then heated at 200–240° C. for 2 to 20 hours under a vacuum of 0.1 to 5 mm. of Hg. Hereby the inherent viscosity of the polyester chips increases from 0.50–0.60 dl./g. to at least 0.85 dl./g., which corresponds to a considerable increase of molecular weight. The ideal conditions can easily be determined by experiments depending on the form and the size of the apparatus and on the inherent viscosity, the specific surface and the amount of scrap material. These experimental conditions are strongly influenced by the specific surface, i.e. by the ratio of surface to volume of the polyethylene terephthalate chips. In order to control the influence of the specific surface on re-polycondensation, samples of polyethylene terephthalate chips of different specific surface have been heated at 230° C. under a vacuum of 0.2 mm. Hg for 8 hours. From these tests it appeared to be of advantage that the polyethylene terephthalate have a form possessing a specific surface as high as possible, which is the case for chips originating from film scrap. It is clear, however, that the desired high viscosity can also be obtained when starting from a polyester form having a smaller specific surface, such as occurs in grains.

The high molecular weight polyethylene terephthalate formed in this way is very suited for being worked up to moulding material.

An increasing of the molecular weight of the polyethylene terephthalate can also be obtained by a re-polycondensation in the melt by using a suitable high-vacuum reaction apparatus, such as a multi-shaft reaction screw as is described by R. Erdmenger in Chemie-Ingenieur-Technik, 36, 175–185 (1964). By using this method, film scrap or any other kind of polyethylene terephthalate can be re-polycondensed in the melt to a sufficiently high molecular weight.

When the inherent viscosity of the available polyethylene terephthalate is higher than 0.65 dl./g., it is not strictly necessary to submit the polyethylene terephthalate to a re-polycondensation process, and in that case it is sufficient to mix it with the low melting polyester, and occasionally with the inert, solid, mineral substance. In the further description will be especially described the working up of polyethylene terephthalate film scrap to moulding material, but the process is applicable to any kind of polyethylene terephthalate as well.

Further, the process according to the invention is characterized thereby that the high molecular weight polyethylene terephthalate having an inherent viscosity of at least 0.65 dl./g. and preferably above 0.85 dl./g. is mixed with an amount of 0.1 to 10% by weight of a polyester possessing a polymer melt temperature of at most 150° C. and in inherent viscosity of at least 0.3 dl./g.

The polymer melt temperature, further on abbreviated to PMT, is defined as the temperature at which a polymer sample becomes molten and leaves a trail when moved with moderate pressure across a hot metal surface (cf. Preparative Methods of Polymer Chemistry, by W. R. Sorenson and T. W. Campbell, Interscience Publishers, 1961, pp. 49–50).

Suitable polyesters are, e.g., polyneopentyl isophthalate (PMT 110° C.), polyneopentyl terephthalate (PMT 115° C.), polyethylene sebacate (PMT 70° C.), polyethylenepthalate (PMT 65° C.), polyethylene isophthalate (PMT 110° C.), polyhexamethylene adipate (PMT 55° C.), polypentamethylene isophthalate (PMT 70–75° C.), the polyester of 2,2-diethyl-propane-1,3-diol with isophthalic acid (PMT 80° C.), the polyester of 1,4-cyclo-hexanedimethanol and adipic acid (PMT 60° C.), and the polyester of 1,4-cyclohexanedimethanol with isophthalic acid (PMT 105° C.). Also copolyesters from these acids and from analogue acids and glycols are quite efficient. All these polyesters are fully compatible with polyethylene terephthalate.

The process according to this invention is furthermore characterized thereby that the melt of the high molecular weight polyethylene terephthalate and the low melting polyester is mixed with 0 to 1% by weight of a finely divided, mineral, inert, solid substance having an average particle size of less than 10μ. For this purpose a lot of substances is considered, but preferably talcum, gypsum, silica, calcium carbonate, alumina, titanium dioxide, dolomite, aluminium silicate, and calcium silicate are used.

It is not absolutely necessary to add such a mineral solid substance. For certain applications it suffices to mix the polyethylene terephthalate with the mentioned amounts of low melting polyester. However, the addition of less than 1% by weight of solid matter in extremely finely divided state greatly promotes the required properties of articles which have to be formed from the moulding material.

A very suited method for preparing the moulding material consists therein that as early as during the polycondensation of the low melting polyester such an amount of inert solid substance.

solid substance is already present in view of the mixture to be formed later. Doing so, e.g. a low melting polyester can be prepared containing 20% of inert solid substance. By mixing this polyester thereafter with 95% of polyethylene terephthalate the final mixture will contain 1% insert solid substance.

Mixing of polyethylene terephthalate, low melting polyester and occasionally solid substance can occur by melting together in an extruder or similar mixing apparatus, whereupon the mixture obtained is transformed by cooling in a form that still can be worked up, such as granules. The mixture can also be moulded directly so as to form articles of use. These articles of use may comprise directly extruded tubes, other profiled articles as well as articles that are to be moulded from granules later.

In practice the mixture is mostly worked up in a mixing extruder to plates or bars which are then chopped to granules. Thes granules can be injection-moulded to articles of use.

In some instances it will be interesting to add to the melt in the mixing extruder small quantities of known moulding additives such as a mould release agent, e.g. a low molecular weight polyethylene or wax.

After injection-moulding the temperature of the mould should preferably be maintained for a short while, e.g., for some 10 seconds to 1 minute, above 120° C., preferably at about 140° C., whereby the crystallization of the articles is promoted. As soon as they are crystalline, the articles become dimensionally stable even above the glass transition temperature of polyethylene terephthalate.

The crystallization behaviour of modified polyethylene terephthalate differs from that of common polyethylene terephthalate so that now also impact resistant articles are obtained.

It appears clearly during the examination of crystallization on a heated polarisation microscope that by mixing polyethylene terephthalate with a low melting polyester and occasionally with an inert filler a thorough modification of crystallization behaviour takes place. Indeed, when a sample of non-modified polyethylene terephthalate is melted at 280° C. and then cooled to 180° C. within about 5 minutes, large spherulites (20–30μ) are visible in the polarisation microscope. These relatively large sizes of spherulites contribute to the brittleness of crystallized non-modified polyethylene terephthalate.

When, however, a sample of modified polyethylene terephthalate according to the present invention is treated in the same way the spherulites are numerous and small, viz. of the order of magnitude of 1μ and even less. This is probably the cause of the higher impact strength of the articles manufactured from polyethylene terephthalate modified according to the method described herein.

A further advantage of the modified polyethylene terephthalate is the very high crystallization speed compared to that of non-modified polyethylene terephthalate, so that crystallization may occur in the mould within a period of time that is acceptable for practical purposes.

It is self-evident that the polyethylene terephthalate during its working up as moulding powder may also be mixed with glass fibers as reinforcing material, whereby an especially high impact strength is obtained.

In the following examples the inherent viscosity $\eta_{inh}$, which is a measure of the degree of polycondensation, was calculated from the equation:

$$\eta_{inh} = \frac{\ln \eta_{rel}}{c}$$

wherein $\eta_{rel}$ (the relative viscosity) was found from $$\eta_{rel} = \frac{\text{flow time of solution}}{\text{flow time of solvent}}$$

and wherein $c$ is the concentration.

$\eta_{rel}$ was determined at 25° C. for a solution having a concentration of 0.5 g. of polyester per 100 cc. of a 60:40 mixture of phenol and sym.tetrachloroethane.

The following examples illustrate the present invention.

EXAMPLE 1

In a tumbling drier 47.5 kg. of polyethylene terephthalate film cuttings obtained by chopping film scrap into pieces of about 1 sq. cm. were heated for 8 hours at 220° C. under a pressure of 0.5 mm. of Hg. Thereby the inherent viscosity of 0.57 dl./g. increased to 0.95 dl./g.

These cuttings were then mixed in the tumbling drier with 2.5 kg. of granulate of a polyester of neopentylglycol and isophthalic acid having an inherent viscosity of 0.40 dl./g. and a PMT of 110° C. This polyester contained 10% by weight of talcum, so that the final talcum content of the mixture amounted to 0.5%. Then this mixture was homogenized by melting it in a mixing extruder, whereupon it was extruded to plates. After chopping of the cooled plates to granules, an injection-mould having heatable moulds was fed therewith. By keeping the mould at about 140° C. during injection-moulding and by maintaining it at that temperature for same further 30 seconds moulded articles were obtained having excellent impact strength and toughness.

EXAMPLE 2

Polyethylene terephthalate having an inherent viscosity of 0.65 dl./g. was dried for 4 hours in a tumbling drier at 150° C. under a pressure of 0.5 mm. Hg. Then an amount of 2% by weight of polypentamethylene isophthalate possessing an inherent viscosity of 0.52 dl./g. and a PMT of 75° C., and an amount of 0.2% by weight of alumina having an average particle size of less than 5µ were added, both percentages being calculated on the weight of polyethylene terephthalate present. Thereupon the mixture was dried for further 4 hours under the same pressure at 80° C.

The mixture was fed in a mixing extruder, homogenized therein and extruded to plates. The further manipulation occurred as in Example 1. Here too, injection-moulded articles were obtained possessing excellent impact strength and toughness.

EXAMPLE 3

Polyethylene terephthalate film cuttings were repolycondensed such as described in Example 1 until their inherent viscosity was increased to 0.95 dl./g.

These cuttings were then mixed in the tumbling drier with 0.5% by weight of granulate of a polyester of neopentyl glycol and terephthalic acid having an inherent viscosity of 0.45 dl./g. and a PMT of 115° C. Further was added 0.2% by weight of talcum. Both percentages are calculated on the weight of the polyethylene terephthalate present. The mixture was homogenized by melting it in a mixing extruder and further treated as described in Example 1. Moulded articles could be manufactured having excellent impact strength and toughness.

We claim:

1. Process for the preparation of moulding material starting from polyethylene terephthalate, characterized thereby that polyethylene terephthalate, having an inherent viscosity of at least 0.65 dl./g. measured at 25° C. in a 60:40 mixture of phenol and tetrachloroethane is mixed with:
   (A) an amount of 0.1 to 10 percent by weight of a saturated polyester at least partly aliphatic in nature, compatible with polyethylene terephthalate, and having a polymer melt temperature of at most 150° C. and an inherent viscosity of at least 0.3 dl./g., and with
   (B) 0 to 1 percent by weight of a finely divided, inert, mineral, solid substance having an average particle size of less than 10µ.

2. Process according to claim 1, wherein the polyethylene terephthalate possesses an inherent viscosity of at least 0.85 dl./g.

3. Process according to claim 1, wherein the polyethylene terephthalate used has been subjected to a repolycondensation reaction until an inherent viscosity of at least 0.65 dl./g. is obtained.

4. Process according to claim 3, wherein the repolycondensation reaction is a solid phase polycondensation reaction.

5. Process according to claim 4, wherein the polyethylene terephthalate used is polyethylene terephthalate film scrap which has been subjected to a solid phase polycondensation until an inherent viscosity of at least 0.65 dl./g. is obtained.

6. Process according to claim 4, wherein the polyethylene terephthalate film scrap cut into chips of at most 10 sq. m., preferably of about 1 sq. cm., is subjected to a solid phase polycondensation for 2 to 20 hours at a temperature comprised between 200 and 240° C. and under a pressure of 0.1 to 5 mm. of Hg.

7. Process according to claim 3, wherein the repolycondensation reaction is executed in the melt in a high-vacuum multishaft reaction screw.

8. Process according to claim 1, wherein the polyester added to polyethylene terephthalate and possessing a polymer melt temperature of at most 150° C. and an inherent viscosity of at least 0.3 dl./g. is a polyester of neopentylglycol and isophthalic acid.

9. Process according to claim 1, wherein the polyester added to polyethylene terephthalate and possessing a polymer melt temperature of at most 150° C. and an inherent viscosity of at least 0.3 dl./g. is a polyester of neopentyl glycol and terephthalic acid.

10. Process according to claim 1, wherein the polyester added to polyethylene terephthalate and possessing a polymer melt temperature of at most 150° C. and an inherent viscosity of at least 0.3 dl./g. is polypentamethylene isophthalate.

11. Process according to claim 1, wherein the finely divided, inert, mineral, solid substance is talcum.

12. Process according to claim 1, wherein the finely divided inert, mineral, solid substance is alumina.

13. Process according to claim 1, wherein the finely divided, inert, mineral, solid substance is added in the desired amount during the polycondensation of the polyester possessing a polymer melt temperature of at most 150° C.

14. A moulding material comprising a mixture of polyethylene terephthalate having an inherent viscosity of at least 0.65 dl./g. measured at 25° C. in a 60:40 mixture of phenol and tetrachloroethane, an amount of 0.1 to 10 percent by weight of a saturated polyester at least partly aliphatic in nature, compatible with polyethylene terephthalate, and having a polymer melt temperature of at most 150° C. and an inherent viscosity of at least 0.3 dl./g., and 0 to 1 percent by weight of a finely divided, inert, mineral, solid substance having an average particle size of less than 10µ.

15. The moulding material according to claim 14 wherein the polyethylene terephthalate possesses an inherent viscosity of at least 0.65 dl./g.

16. The moulding material according to claim 14 wherein the polyethylene terephthalate used has been subjected to a repolycondensation reaction until an inherent viscosity of at least 0.65 dl./g. is obtained.

17. The moulding material according to claim 14 wherein the polyethylene terephthalate used is polyethylene terephthalate film scrap which has been subjected to a solid phase polycondensation until an inherent viscosity of at least 0.65 dl./g. is obtained.

18. The moulding material according to claim 17 wherein the polyethylene terephthalate film scrap is cut into chips of at most 10 sq. m., preferably of about 1 sq. cm., and subjected to a solid phase polycondensation for 2 to 20 hours at a temperature of between 200 and 240° C. and under a pressure of 0.1 to 5 mm. of Hg.

19. The moulding material according to claim 14 wherein the polyester is a polyester of nonpentylglycol and isophthalic acid.

20. The moulding material according to claim 14 wherein the polyester is a polyester of neopentyl glycol and terephthalic acid.

21. The moulding material according to claim 14 wherein the polyester is polypentamethylene isophthalate.

22. The moulding material according to claim 14 wherein the finely divided, inert, mineral, solid substance is talcum.

23. The moulding material according to claim 14 wherein the finely divided, inert, mineral, solid substance is alumina.

References Cited

FOREIGN PATENTS 1,034,014    6/1966    Great Britain _____ 260—860

MORRIS LIEBMAN, Primary Examiner

L. T. JACOBS, Assistant Examiner

U.S. Cl. X.R.

260—860

UNITED STATES PATENT OFFICE
CERTIFICATE OF CORRECTION

Patent No. 3,565,852          Dated February 23, 1971

Inventor(s) Andre Jan Conix and Lambert Gaston Jeurissen

It is certified that error appears in the above-identified patent and that said Letters Patent are hereby corrected as shown below:

Column 3, line 75, "inert solid substance." should read -- inert solid substance is added that the desired quantity of --. Column 6, claim 1 line 3, "0.65" should read -- 0.85 --. Column 7, claim 19, line 2, "nonpentylglycol" should read -- neopentylglycol --.

Signed and sealed this 23rd day of May 1972.

(SEAL)
Attest:

EDWARD M. FLETCHER, JR.
Attesting Officer

ROBERT GOTTSCHALK
Commissioner of Patents